United States Patent

[11] 3,588,849

[72] Inventors Dennis J. Lynes
Madison;
Harold Shichman, Westfield; Sigurd G. Waaben, Princeton, N.J.

[21] Appl. No. 738,156
[22] Filed June 19, 1968
[45] Patented June 28, 1971
[73] Assignee Bell Telephone Laboratories, Incorporated
Murray Hill, N.J.

[54] DIGIT LINE COUPLING CIRCUITS FOR DIGITAL STORES
23 Claims, 7 Drawing Figs.

[52] U.S. Cl. ........ 340/174
[51] Int. Cl. ........ G11c 7/00, G11c 11/14
[50] Field of Search ........ 340/174 (M)

[56] References Cited
UNITED STATES PATENTS

| | | | |
|---|---|---|---|
| 3,243,787 | 3/1966 | Habib | 340/174 |
| 3,293,626 | 12/1966 | Thome | 340/174 |
| 3,436,741 | 4/1969 | Barrett | 340/174 |
| 3,436,744 | 4/1969 | Sakalay | 340/174 |
| 3,283,313 | 11/1966 | Hathaway | 340/174 |

*Primary Examiner*—James W. Moffitt
*Attorneys*—R. J. Guenther and Kenneth B. Hamlin ABSTRACT: A group of direct current coupling arrangements for a magnetic memory provide design alternatives which reduce magnetic memory cycle time and fabrication cost. In each arrangement, balanced digit lines, which are arranged in two symmetrical modules, are direct current coupled to both a digit drive circuit and an amplifier-detector circuit. Word selection circuits are arranged symmetrically to couple similar spurious noise signals into the digit lines of both symmetrical modules. The amplifier-detector circuit is arranged to operate in its region of linear conduction in response to digit drive signals and to convert information signals from the digit lines into complementary level output signals without reflecting an impedance unbalance onto the digit lines. In each arrangement, a direct current coupling circuit is designed so that the digit drive signals and the noise signals are rejected and information signals are detected.

INVENTORS D. J. LYNES
H. SHICHMAN
S. G. WAABEN

BY Charles Scott Phelan
ATTORNEY

DIGIT LINE COUPLING CIRCUITS FOR DIGITAL STORES

BACKGROUND OF THE INVENTION

1. Field of the Invention

The invention is a group of coupling arrangements that are more particularly described as arrangements for direct current coupling digit lines of a magnetic memory to both a digit drive circuit and an amplifier-detector circuit.

2. Description of the Prior Art

A very desirable component of digital computer technology is an inexpensive, noise immune, and fast operating random-access memory. Prior art developments generally improve one or more of the characteristics just mentioned and adversely affect another or others. For instance, a particular development may reduce fabrication cost and increase noise immunity, but at the same time it adversely affects one or more of the desirable characteristics, such as the speed of operation.

Cost reduction developments related to fabrication of random-access memories have resulted in integrated magnetic memories in which one continuous process produces both active elements and their interconnections. Some prior art integrated memories use plated-wire magnetic elements, and others use either monolithic ferrite magnetic elements or flat film magnetic elements.

These integrated magnetic memories include an array of magnetic storage elements, each of which is magnetically coupled to two orthogonally oriented conductors. The orthogonally oriented conductors are considered to be column and row conductors of a grid and hereinafter are referred to, respectively, as a word line and a digit line. The grid includes several column conductors and several row conductors making an array of intersection points. A different one of the magnetic storage elements is coupled magnetically to each of the intersecting conductors at each grid intersection. The storage elements, the word lines, and the digit lines necessarily are arranged compactly, and a resulting significant capacitive coupling occurs between the word lines and the digit lines.

In operation, such memory grids are subject to reduction of speed of operation because digit drive signals saturate a sense amplifier, and such grids also are subject to operational errors because noise signals are inductively and capacitively coupled from the word lines into one or more of the digit lines. This noise coupled into the digit lines often has sufficient amplitude to cause an erroneous indication for stored information being read out unless the noise is rejected before it is applied to a detector circuit.

In the prior art, a balanced magnetic ring circuit is used for alternating current coupling a pair of symmetrical digit lines to a digit driver and to a sense amplifier, which is interposed between the digit lines and the detector circuit. The potentially troublesome problems of digit drive signals and noise are overcome by this magnetic ring circuit because it is arranged as a double hybrid so that the digit drive signals and the digit line noise are cancelled therein. Information signals are readily coupled from the digit lines through the magnetic ring circuit to the sense amplifier.

Even though the magnetic ring circuit enhances magnetic memory operation by cancellation of digit drive signals and noise, the ring circuit imposes certain detrimental characteristics on the memory. For instance, the grid arrangement of word lines and digit lines together with numerous magnetic storage elements are fabricated inexpensively by a continuous automatic process, but the balanced magnetic ring circuit must be installed by expensive hand-wiring. Additionally, during memory operation when coupled between a pair of digit lines and the sense amplifier, the magnetic ring circuit inserts a substantial delay time in the sensing operation and thereby slows memory speed.

Because of the above-stated disadvantages resulting from alternating current coupling magnetic memory digit lines to the digit driver and to the detector circuit, many unsuccessful attempts have been made in the prior art to find a workable arrangement for direct current coupling magnetic memory digit lines to digit drive and detection circuits.

Three problems have occurred in prior art attempts to effectively direct current couples magnetic memory digit lines to digit drive and sense amplifier circuits. A first problem is a failure to adequately cancel or reject spurious noise that is coupled into the digit lines during selection operations. A second problem is that digit drive signals are directly applied to the sense amplifier input terminals, and these signals have sufficient amplitude to drive the sense amplifier into saturated operation. While thus operating in saturation, the sense amplifier is insensitive to information signals so that a readout operation must be delayed until the amplifier recovers to linear operation. A third problem is that during readout operations information signals from the digit lines cause the detector circuit to change from a normally balanced input impedance to an unbalanced input impedance across the digit lines. This impedance unbalance in turn causes undesirable differential-mode signal reflections which interfere with detection of the information signals. Although each of these problems has been solved in the prior art, the prior art solutions have been directed toward the individual problems and have failed to solve all three of the problems in a single memory.

It is therefore desirable to develop a direct current coupling arrangement which eliminates the need for the hand wired balanced magnetic ring without subjecting memory operation to the aforementioned problems resulting from prior direct current coupling arrangements.

It is an object of this invention to reduce the cycle time of a random access magnetic memory.

It is a further object to direct current couple magnetic memory digit lines to a detection circuit so that during write-in operations digit drive signals and spurious noise are effectively rejected.

It is a further object to couple the digit drive and detection circuits together by means of symmetrical direct current coupling configurations of the digit lines so that an amplifier in the detection circuit operates in a linear region of its operating characteristics while digit drive signals are applied to the digit lines.

It is still a further object to reduce the cost of coupling a magnetic memory to its digit drive and detection circuits.

These and other objects of the invention are realized in a group of illustrative embodiments thereof in which a plurality of digit lines of a magnetic memory are arranged in a closed loop. An amplifier-detector circuit is direct current coupled across the loop in a first branch circuit. A digit drive circuit is direct current coupled across the digit line loop in a second branch circuit that is a conjugate branch of the first branch circuit. Similar noise and similar digit drive signals on symmetrical digit lines are propagated concurrently to the amplifier-detector circuit in all of the various coupling schemes and are readily rejected by the amplifier-detector circuit.

It is a feature of the invention to arrange a plurality of digit lines in a closed loop having a digit drive circuit direct current coupled thereacross in a first branch circuit and having an amplifier-detector circuit direct current coupled thereacross in a second branch circuit which is a conjugate of the first branch circuit.

Another feature is a symmetrical access structure which couples similar noise signals to digit lines arranged in a closed loop having an amplifier-detector circuit coupled thereacross in a first branch circuit receiving the noise as common-mode signals.

Another feature is a conjugate branch direct current coupling arrangement of a digit drive circuit and an amplifier-detector circuit which converts information signals generated on a closed loop of impedance balanced digit lines into complementary output signals without causing an impedance unbalance on the digit lines.

Another further feature is arranging symmetrical digit lines and symmetrical direct current coupling circuits so that similar spurious noise components, which are coupled into the digit lines of two modules, arrive concurrently at the input of a differential sense amplifier whereby they are rejected.

BRIEF DESCRIPTION OF THE DRAWINGS

A better understanding of the invention may be derived from the detailed description following if that description is considered with respect to the attached drawings in which.

DETAILED DESCRIPTION

Figure 1:
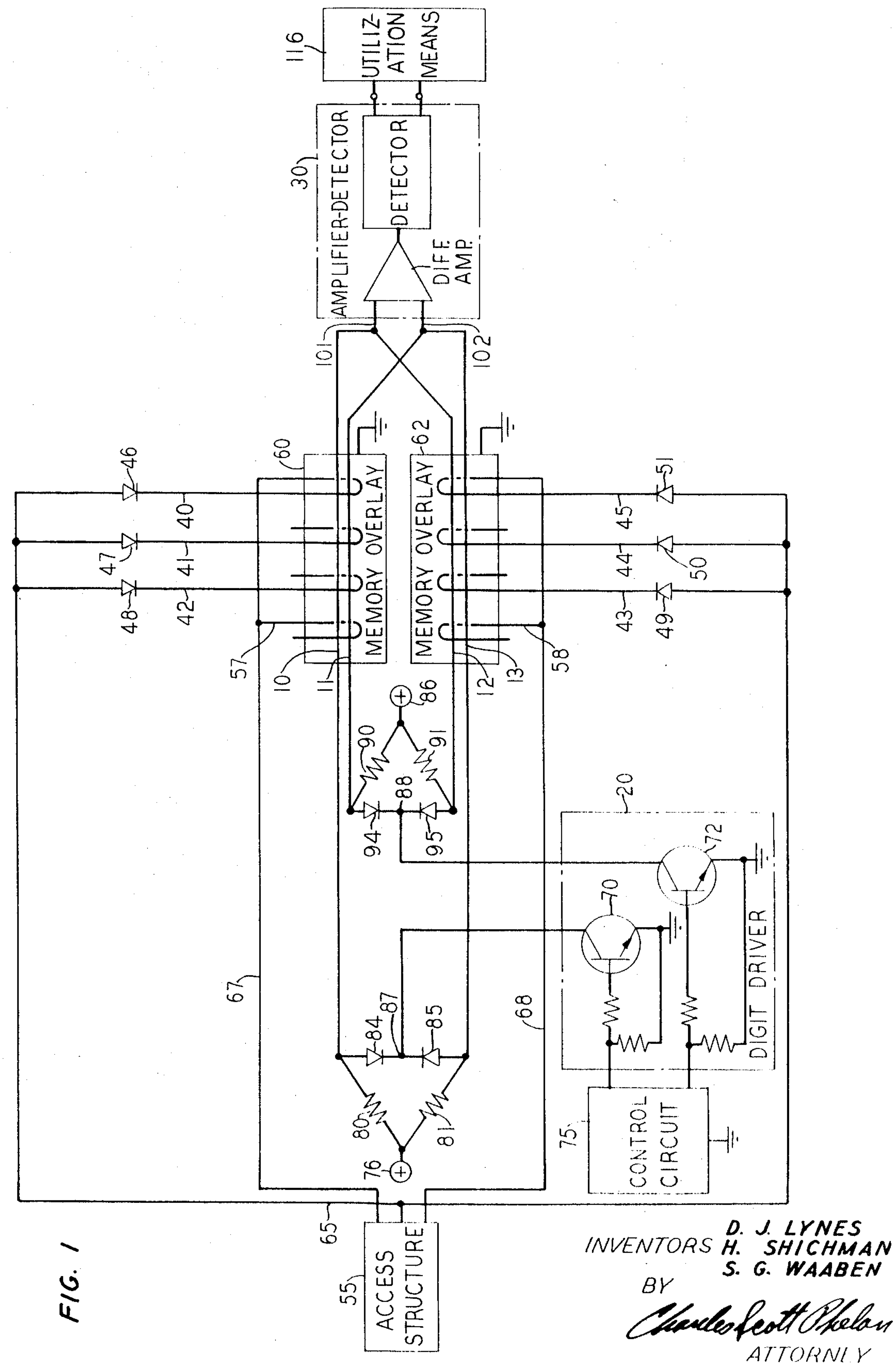
FIG. 1 is a schematic diagram of a symmetrical direct current coupling arrangement for a magnetic memory in accordance with the invention.

Referring now to FIG. 1, there is shown a schematic diagram of an embodiment of a bridge-type arrangement for direct current coupling magnetic memory digit lines 10, 11, 12, and 13 to a digit driver 20 and to an amplifier-detector circuit 30. The digit lines 10, 12, 11, and 13 are coupled together in that order in a closed loop having the amplifier-detector circuit 30 connected thereacross in a first branch circuit. The digit driver 20 is coupled across the loop in a second branch circuit that is a conjugate of the first branch. Conjugate branches of a circuit are branches of the circuit wherein a change of voltage in one branch causes no substantial change of current in the other branch.

The electrical and mechanical configuration of the digit lines 10, 11, 12, and 13, their associated word lines 40, 41, 42, 43, 44, and 45, associated selection diodes 46, 47, 48, 49, 50, and 51, and a floating access structure 55 have previously been described in considerable detail in a U.S. Pat. application, Ser. No. 591,237, now Pat. No. 3,484,764, issued in the names of T. R. Finch and S. G. Waaben. Therefore, the description of the overall arrangement herein is limited to information which particularly describes the invention herein and which differs from the description of the just mentioned patent application.

In the U.S. Pat. application Ser. No. 591,237 just mentioned, a magnetic memory store system structure is disclosed. The store system therein is assumed to be operated by a central control system and includes a symmetrically arranged floating access circuit structure, such as the access structure 55 herein. This access structure 55 includes diode rail switches, word rail switches, word rail clamps, and diode rail clamps all of which are parts of the symmetrical arrangement which permits an associated selection matrix to be characterized as equipotentially arranged. Each cross-point of the selection matrix includes a diode and a word line. All word line circuits are of substantially the same length. The floating access circuit structure has a neutral that is separate from a common ground for the entire store system.

As shown in FIG. 1, the digit lines 10, 11, 12, and 13 are conventional coated-wire conductors, for instance, beryllium-copper wires electroplated with a magnetic film such as permalloy. The digit lines 10 and 11 and the digit lines 12 and 13 are pairs of straight parallel lengths of this wire. The magnetic film is coated anisotropically on the wire so that different magnetic properties occur in different directions relative to the wire. In the direction of the longitudinal axis of the wire, the permalloy exhibits little hysteresis, and this direction is called the hard direction of magnetization. Circumferentially about the wire, the permalloy exhibits nearly perfect square loop hysteresis, and the circumferential direction is called the easy direction of magnetization.

In the memory arrangement shown in FIG. 1, each plated-wire storage element has two storage cells per information bit to be stored. These two storage cells for any particular information bit are defined by orthogonal crossings of a word line, such as a word line 40, with the digit lines 10 and 11. Although the diagram appears to show four crossings of these lines, in actual practice the crossings occur at only one location on each of the digit lines 10 and 11. Therefore, the crossing of the word line 40 with the digit line 10 defines one of the two cells and the crossing with the digit line 11 defines the second cell.

There is significant capacitive coupling between the word line 40 and the digit lines 10 and 11 at the points where they cross. In a similar manner, other word lines such as word lines 41, 42, 43, 44, and 45, in the memory of FIG. 1, are capacitively coupled to digit lines, such as digit lines 10 and 11, or 12 and 13, or other digit lines, not shown.

All the digit lines in the memory of FIG. 1 are arranged in one or the other of two symmetrical modules. Thus the digit lines 10 and 11 are considered to be fixed on a first memory overlay 60 in a first module, and the digit lines 12 and 13 are considered to be fixed on a second memory overlay 62 in a second module. These digit lines 10, 11, 12 and 13 are all of a commercially uniform gauge and all of equal length.

Although the schematic of FIG. 1 appears to be to the contrary, the digit lines 10, 11, 12, and 13 are electrically long with respect to anticipated readout information signal pulse lengths so that pairs of the digit lines are considered to perform like transmission lines. The transmission line considerations extend not only to the digit lines 10, 11, 12, and 13 but also to the memory overlays 60 and 62, which are slotted to accommodate all of the digit lines and the word lines. A sheet of magnetic material, such as permalloy, is secured to the surface of each of the overlays 60 and 62 to form a nonpolarized enhancement plate for flux generated by currents in the word lines and to form a ground plane for the digit lines 10, 11, 12, and 13.

For instance, the digit lines 10 and 11 are considered to be a transmission line. In addition, there is significant capacitive coupling between each of the digit lines 10 and 11 and the magnetic sheet secured to the memory overlay 60. Therefore, the digit line 10 and the memory overlay 60 form a second transmission line, and the digit line 11 and the memory overlay 60 form a third transmission line. These three transmission lines are duplicated among the digit lines 12 and 13 and the memory overlay 62.

Although once again not accurately represented in the schematic of FIG. 1, the portions of the digit lines 10, 11, 12, and 13 which are coupled to the digit driver 20 and which are cross-connected among one another and to the amplifier-detector circuit 30 are kept as short as possible. They are therefore electrically short with respect to the anticipated readout information signal pulse lengths. These portions of the digit lines are kept short to minimize adverse effects of discontinuities in the previously mentioned transmission lines.

Symmetry within the memory of FIG. 1 is an important characteristic which is essential to realization of the objects and features of the invention. The access structure 55 is connected to a diode rail 65, which is arranged in symmetrical branches and which couples the access structure 55 to the selection diodes 46, 47, 48, 49, 50, and 51. These selection diodes are split into two symmetrical groups. A first group of selection diodes 46, 47, and 48 couple the diode rail 65, respectively, to the word lines 40, 41, and 42. A second group of selection diodes 49, 50, and 51 couple the diode rail 65 respectively to the word lines 43, 44, and 45.

The symmetry of the memory of FIG. 1 is extended further. For instance, the word lines are split into symmetrical groups. A first group of word lines 40, 41, and 42 is coupled to the digit lines 10 and 11 in a manner similar to the manner in which a second group of word lines 43, 44, and 45 is coupled to the digit lines 12 and 13.

One word line from each group of word lines associated with a memory overlay is connected in parallel with one word line from each other group of word lines associated with the same memory overlay. For instance, the word line 40 from the first group of word lines associated with the memory overlay 60 is connected in parallel with a word line 57 from a second group of word lines associated with the memory overlay 60. A similar parallel circuit connection is made between the word lines 45 and 58 associated with the memory overlay 62. The points of interconnection of these parallel circuits are connected through word rails 67 and 68 back to the access circuit structure 55 to return to the neutral of the access circuit structure 55.

There is further symmetry in the construction of the memory of FIG. 1. The coupling of the closed loop of the digit lines 10, 11, 12 and 13 to the digit driver 20 and to the amplifier-detector circuit 30 is arranged symmetrically but before describing that arrangement a digression is to be made for the purpose of describing the digit driver 20.

In the digit driver 20, a first NPN transistor 70 and a second NPN transistor 72 are connected in separate common-emitter arrangements and are actuated in response to signals from a control circuit 75. The control circuit 75 applies signals to the inputs of the transistors so that either the transistors 70 and 72 are both cut off or one of them is conducting at a time. The transistors 70 and 72 therefore do not both conduct coincidentally. Collector circuits of the transistors 70 and 72 are coupled symmetrically to the digit lines 10, 11, 12, and 13 of the memory.

In FIG. 1, as well as in other FIGS. of the specification, power supplies are indicated as a circle enclosing either a positive or a negative polarity symbol. These symbols indicate that a power supply terminal of the indicated polarity is connected to the circuit at the point where shown, and a power supply terminal of opposite polarity is connected to ground.

Thus in FIG. 1, a positive potential power supply 76 is coupled symmetrically through a pair of balanced resistors 80 and 81, respectively, to the digit lines 10 and 13. Similar diodes 84 and 85, respectively, direct current couple the digit lines 10 and 13 to a common junction 87 in the collector circuit of the transistor 70. Thus, the collector of the transistor 70 is direct current coupled symmetrically to the digit lines 10 and 13, which are impedance balanced through the resistors 80 and 81 and the power supply 76 to ground potential.

Similarly, a positive potential power supply 86 is coupled symmetrically through a pair of balanced resistors 90 and 91, respectively, to the digit lines 11 and 12. The resistors 90 and 91 also are balanced with respect to the resistors 80 and 81. Similar diodes 94 and 95, respectively, direct current couple the digit lines 11 and 12 to a common junction 88 in the collector circuit of the transistor 72. Thus, the collector of the transistor 72 is direct current coupled symmetrically to the digit lines 11 and 12, which are impedance-balanced through the resistors 90 and 91 and the power supply 86 to ground potential.

The other ends of the digit lines 10, 11, 12, and 13 are direct current connected symmetrically to the amplifier-detector circuit 30. Significantly, the digit lines are connected to the amplifier-detector circuit 30 in a symmetrical configuration which maintains not only the overall symmetry of the memory but also maintains the impedance balance on the digit lines during operation. The digit lines 10 and 12 are connected to a first input lead 101 of the amplifier-detector circuit 30, and the digit lines 11 and 13 are connected to a second input lead 102 of the amplifier-detector circuit 30. Thus, for each pair of digit lines from one memory overlay such as the digit lines 10 and 11, each line of the pair is connected to a different input lead of the amplifier-detector circuit 30.

To conserve the symmetrical arrangement and the impedance balance of the digit lines, the digit lines associated with the collector circuit of the same transistor in the digit driver are connected to opposite input leads of the amplifier-detector circuit 30. Thus, the digit lines 10 and 13, associated with the collector circuit of the transistor 70, are connected respectively to the input leads 101 and 102, and the digit lines 11 and 12, associated with the collector circuit of the transistor 72, are connected respectively to the input leads 102 and 101. The digit lines 11 and 12 are therefore cross-connected from their overlay memory positions to the input leads 101 and 102 of the amplifier-detector circuit for purposes which will become apparent hereinafter.

The symmetry of the digit lines 10, 11, 12, and 13 should be carried further. Since the digit lines 10 and 13 couple the collector circuit of the transistor 70 to the input leads 101 and 102, the length of the digit line 10 from the diode 84 to the lead 101 should be substantially equal to the length of the digit line 13 from the diode 85 to the lead 102. The respective connections between the diodes 84 and 85 and the junction 87 are considered to be short and essentially of equal length. Similarly, the length of the digit line 11 from the diode 94 to the lead 102 should be substantially equal to the length of the digit line 12 from the diode 95 to the lead 101. Again, the respective connections between the diodes 94 and 95 and the junction 88 are short and of equal length.

Each word line, such as word line 40, which is coupled to the digit lines 10 and 11 in the first memory overlay 60 should be positioned symmetrically with respect to another word line, such as word line 45, which is coupled to the digit lines 12 and 13 in the second memory overlay 62. The symmetry between word lines includes two aspects. In the first aspect, the word line 40 must intersect the digit lines 10 and 11 at points that are the same distance from the leads 101 and 102 as the points on the digit lines 12 and 13 where the word line 45 intersects. The second aspect is that the word line 40 should couple the digit lines 10 and 11 in an arrangement similar to the arrangement of coupling the word line 45 to the digit lines 12 and 13 so that inductive and capacitive coupling between the word lines 40 and 45 and their respective digit lines is as nearly identical as possible.

Before commencing a description of the operation of the embodiment of FIG. 1, it is necessary to digress once again. This time the digression is for the purpose of describing the amplifier-detector circuit 30, which is shown schematically in FIG. 2.

Figure 2:
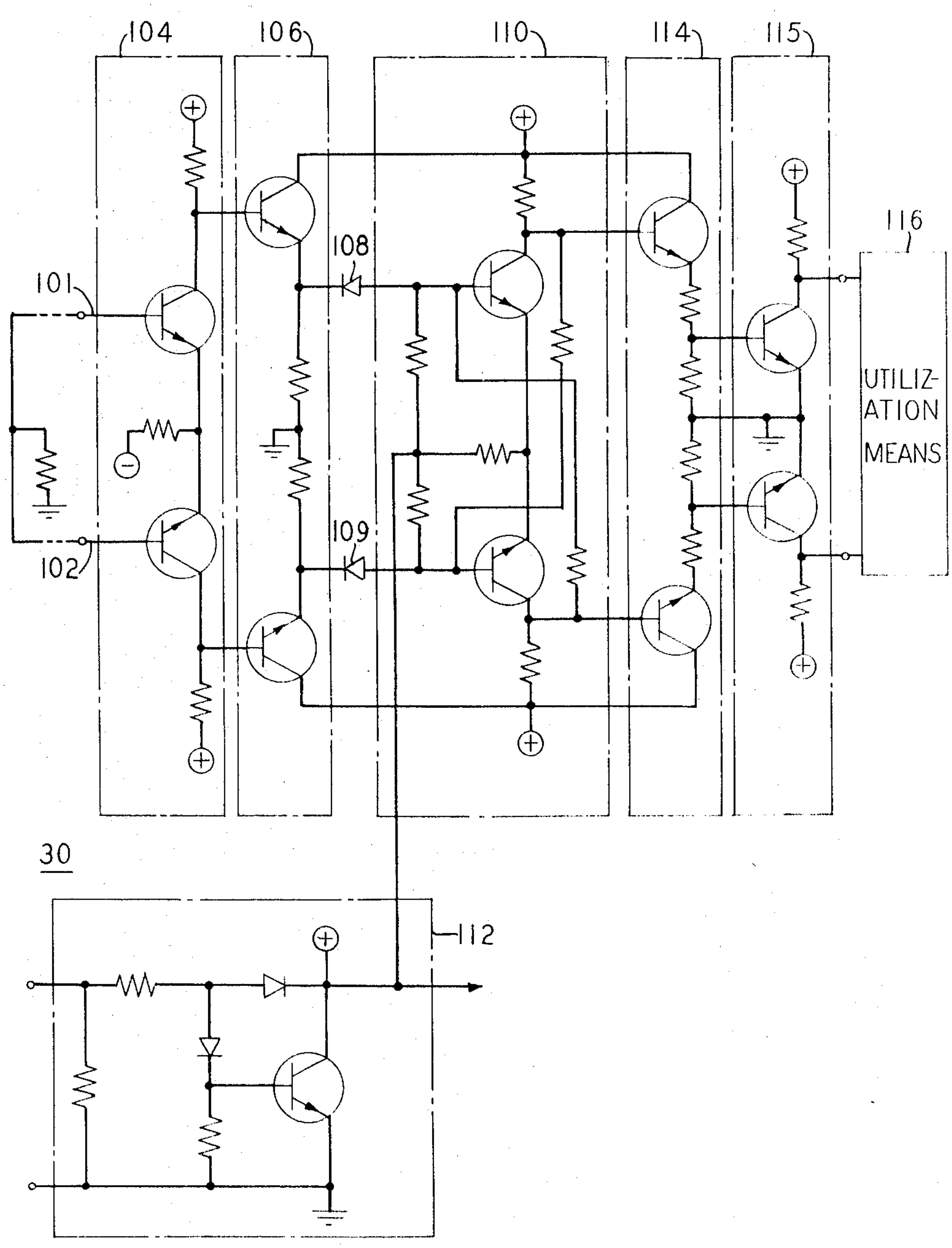
FIG. 2 is a schematic diagram of an amplifier-detector circuit used in several illustrative embodiments of the invention.

Referring now to FIG. 2, the amplifier-detector 30 is a circuit which has previously been described in a U.S. Pat. application, Ser. No. 614,237, now U.S. Pat. No. 3,480,800, issued in the names of D. J. Lynes and S. G. Waaben. Balanced input leads 101 and 102 are connected to the base electrode inputs of a differential amplifier 104. Balanced output signals from the differential amplifier 104 are coupled separately to inputs of a balanced emitter-follower circuit 106. Balanced output signals from the emitter-follower circuit 106 are each coupled separately by way of diodes 108 and 109 to base input electrodes of separate transistor stages in a trigger circuit 110. A strobe circuit 112 is resistively coupled to the inputs of the trigger circuit 110. The diodes 108 and 109 are poled to decouple the emitter-follower circuit 106 from the trigger circuit 110 in response to a strobe signal from the strobe circuit 112 and to couple the emitter-follower circuit 106 to the inputs of the trigger circuit 110 in the absence of the strobe signal from the strobe circuit 112. When the emitter-follower circuit 106 is thus coupled to the trigger circuit 110, the two stages of the trigger circuit are urged to conduct in response to the relative conduction in the two stages of the balanced emitter-follower circuit 106. Output signals from the trigger circuit 110 are complementary level signals which represent information bits 1 and 0 generated on the digit lines and coupled to the input leads 101 and 102. Output signals from the trigger circuit 110 are coupled through another balanced emitter-follower circuit 114 to a balanced amplifier 115 and a utilization means 116.

This amplifier-detector circuit 30 is arranged so that during readout operations it converts information signals generated on the digit lines 10, 11, 12, and 13 of the embodiment of FIG. 1 into the complementary level output signals just mentioned without reflecting an impedance unbalance through the input leads 101 and 102 to the digit lines 10, 11, 12, and 13, shown in FIG. 1.

In response to digit drive signals required for writing into the plated-wire digit lines 10, 11, 12, and 13 of FIG. 1, the amplifier-detector circuit 30 operates in the linear portion of its operating characteristics rather than in saturation. In FIG. 2, the transistors of the differential amplifier 104 are biased so that they remain continuously conducting in response to any anticipated input signal level. Their bias is designed to prevent them from operating in a saturated conduction state in response to anticipated input signals, including digit drive signals, and to enable the transistors to follow anticipated input signal variations rapidly without the delay times ordinarily required for recovery from a saturated conduction condition from time to time. By continuously operating the differential amplifier 104 in a linear conduction range, it presents substantial and continuous high input impedances to the digit lines 10, 11, 12, and 13 of FIG. 1. The continuous high input impedance is greater than a characteristic impedance of the digit lines, effectively maintains the impedance balance of the digit lines 10, 11, 12, and 13 and thereby reduces unbalanced signal reflections which might otherwise occur and hinder information signal detection.

The embodiment of FIG. 1, as well as other embodiments to be described hereinafter, operates cyclically. The cycle includes a write-in operation, a recovery period, and a readout operation.

During the write-in operation of any particular cycle, symmetrical word line groups, such as the group of word lines 40, 41, and 42 and the group of word lines 43, 44, and 45, are partially selected by circuitry in the access structure 55 to form similar conduction loops. In the access structure 55, a diode rail switch closes between a power supply and the diode rail 65 to raise the potential on the diode rail thus partially selected. This partial selection increases the potential on all word lines, such as the word lines 40, 41, 42, 43, 44, and 45, coupled thereto and creates two similar alternating current coupled loops. One such loop comprises the diode rail 65, the diodes 46, 47, and 48, the word lines 40, 41, and 42, the digit lines 10 and 11, inherent capacitance not shown, and the memory overlay 60 back to the access structure 55. The second of such loops comprises the diode rail 65, the diodes 49, 50, and 51, the word lines 43, 44, and 45, the digit lines 12 and 13, inherent capacitance not shown, and the memory overlay 62 back to the access structure 55. A word rail switch thereafter closes between the access circuit neutral and a selected word rail, such as the word rail 67, to reduce the potential on the word rail 67. A selected word line 40 and its associated diode 46 couple the selected diode rail 65 to the selected word rail 67 to complete a conduction loop.

This loop conducts a word line current which is inductively coupled to all digit lines spatially intersecting the word line 40. Because of the orthogonal intersections between word line 40 and digit lines 10 and 11, the inductive coupling forces the magnetic material of the magnetic storage cells at the intersections to rotate to the hard direction of magnetization. This rotation to the hard direction of magnetization may be to either polarity with respect to the longitudinal axis of the digit lines 10 and 11 and is determined by current polarity in the word line 40.

The diode rail selection and word rail selection of word lines produce on the digit lines 10, 11, 12, and 13 noise which tends to mask, or hide, information signals subsequently to be read out of the memory. The noise is inductively and capacitively coupled to the various digit lines. For instance, when the potential on the word lines 40, 41, 42, 43, 44, and 45 is raised in response to diode rail selection, noise is capacitively coupled through inherent capacitance to every digit line that the word lines 40, 41, 42, 43, 44, and 45 intersect. As the potential on each word line is raised, a small charging current occurs in each of the word lines, and this current is coupled inductively as noise into any digit lines slightly skewed from a right angle with any one of the respective word lines 40, 41, 42, 43, 44, and 45. The fully selected word line 40 conducts word line drive current which is induced into the partially selected word lines 41 and 42 that are positioned parallel to the selected word line 40. This induced current in the partially selected word lines 41 and 42 causes extraneous tipping of flux in the storage cells along the digit lines 10 and 11.

All of the above-mentioned noise signals coupled into the digit lines 10 and 13 are similar to other noise signals coupled respectively into the digit lines 11 and 12 because of the symmetry in the access structure 55, the diode rail 65, the word lines 40, 41, 42, 43, 44, and 45, the word rails 67 and 68, and the digit lines 10, 11, 12, and 13. Noise components thus coupled into any one point on one digit line are similar to noise components coupled into a symmetrical point on another symmetrically arranged digit line so that the two components of noise are rejected as common-mode signals by the amplifier-detector circuit 30.

These components of noise signals once coupled into the digit lines, such as digit lines 10 and 11, are voltage signals that are propagated in both directions along the digit lines 10 and 11 from the points at which they are coupled into those digit lines. The noise components that are directed toward the amplifier-detector circuit 30 arrive concurrently with each other as common-mode voltage signals which are rejected by the differential amplifier 104 of FIG. 2. The noise components which are initially propagated away from the amplifier-detector circuit 30 eventually may be reflected back toward the differential amplifier 104.

The reflected components on the digit lines 10 and 11 also are common-mode voltage signals which are rejected by the amplifier 104. The digit lines 10, 11, 12, and 13 are terminated in balanced resistors to minimize the effect of reflections that may occur as a result of noise signals propagated along the digit lines 10, 11, 12, and 13. The terminating resistors are inserted in the memory to maintain impedance balance of the digit lines and are located at points along the digit lines equally distant from the differential amplifier 104. Thus, a noise signal incident to a terminating resistor on one digit line, such as the digit line 10, is paired with another noise signal of equal magnitude and phase on another line, such as the digit line 11. The incident signals are reflected from the balanced resistors as a pair of voltage signals of essentially equal magnitude and phase. These reflected signals travel through an equal distance to the input leads 101 and 102 of the amplifier-detector and therefore arrive as common-mode voltage signals which are rejected by the differential amplifier 104.

Also during the write-in operation and while the magnetic flux is oriented in the hard direction of magnetization, a digit drive signal is applied to the digit lines 10, 11, 12, and 13. For instance, consider that because of signals applied by the control circuit 75 the transistor 70 conducts and the transistor 72 is cut off. The potential of junction 87 is lowered to near ground, and the potential of junction 88 is held near the potential of the supply 86. Digit drive current is conducted from the supply 86 through the resistor 90, the digit lines 11 and 13, the diode 85, and the transistor 70 to ground. A similar digit drive current is conducted from the supply 86 through the resistor 91, the digit lines 12 and 10, the diode 84, and the transistor 70 to ground. These digit drive currents are poled so that the magnetic flux, established in the cell material by word line current in word line 40, in the two intersected storage cells of digit lines 10 and 11, is tipped toward an easy direction of magnetization. Polarity of both the word line current and the digit drive current must be considered to determine the polarity into which the magnetic flux of the two selected cells is tipped.

Once this magnetic flux is tipped, the word rail switch and the diode rail switch in the access structure 55 are opened, and the magnetic flux in the influenced cells remains oriented in the direction into which it was tipped by the digit line current which is thereafter terminated. This orientation of the magnetic flux represents the information written into those cells insofar as a polarization in a first easy direction of magnetization represents a 1 and a polarization in a second easy direction of magnetization represents a 0.

It should be noted that during each write-in operation only one word line is selected to conduct a current and orient the flux of two storage cells into the hard direction of magnetization. Such an orientation of flux is an essential step for writing in information so that information is only stored in the two storage cells thus selected. All other cells retain the flux condition previously existing therein.

After the word rail and diode rail switches in the access structure 55 are opened, the recovery period commences. First, the digit drive currents are terminated, and thereafter the digit lines undergo a transient recovery to their standby potential level. When the invention is practiced using the circuit of FIG. 2, the necessary recovery period during which the differential amplifier 104 recovers sensitivity is significantly less than the length of the recovery period required for circuits having a detection circuit which occasionally operates in a saturated conduction condition in response to such digit drive signals.

The digit drive signals are applied to the digit lines only during the write-in operation and they propagate through the lines in equal time to arrive at the input leads 101 and 102 coincidentally. During the write-in operation, the digit drive signals are applied directly to the digit lines and are coupled therethrough to the input leads 101 and 102 of the amplifier-detector circuit 30. The symmetrical arrangement of the digit line coupling scheme assures that every digit drive signal applied to one digit line, such as digit line 10, has a counterpart applied to a symmetrically positioned digit line, such as the digit line 13. Because the digit lines are equally long, the digit drive signals arrive concurrently at the input of the differential amplifier of the amplifier-detector circuit 30 as common-mode signals which are rejected by the differential amplifier 30. The common-mode signals thus applied to the input of the amplifier-detector 30 cause no substantial change of current in the detector branch of the bridge because the input impedance of the amplifier-detector circuit 30 is high with respect to the characteristic impedance of the digit lines. Therefore, the circuit 30 is considered to be in a conjugate branch with respect to the branch including digit driver circuit 20 which concurrently has undergone a change of potential.

Information signals stored in the storage cells are read out of those cells only during a readout operation. During the readout operation of any particular cycle, a single word line is selected by the access structure 55 to complete a conduction loop in a manner similar to the selection of a word line during the write-in operation. Once again a word line current is conducted, for instance, through the word line 40 so that it is coupled inductively to the magnetic material of the intersected storage cells of the digit lines 10 and 11. This word line current causes the magnetic flux to once again rotate to the hard direction of magnetization. There is no digit drive current applied to the digit lines 10, 11, 12, and 13, but the rotation of the flux in the intersected storage cells of the digit lines 10 and 11 generates the readout information signals which are propagated in both directions along the digit lines 10 and 11. In one direction along the digit lines 10 and 11, these voltage signals are propagated directly toward the amplifier-detector circuit 30, shown in FIG. 1, and are applied to opposite ones of the input leads 101 and 102 of the amplifier-detector circuit 30. The voltage signals thus generated upon readout have a polarity corresponding to the information state previously stored in the cells. Therefore, a readout signal of a first polarity indicates a 1 had been stored, and a readout signal of a second polarity indicates a 0 had been stored. With regard to the readout information signal components initially propagated toward the amplifier-detector circuit 30, the two storage cells of the selected bit generate voltage components having opposite polarities on their respective digit lines. These opposite polarity voltage components are propagated to the inputs 101 and 102 of the amplifier-detector 30 as differential-mode voltage signals which are readily detected by the differential amplifier 104 of FIG. 2. With respect to the readout information signal components initially propagated away from the amplifier-detector circuit 30, they are partially dissipated in the terminating resistors and partially reflected as differential-mode voltage signals. The reflected signals arrive at the amplifier-detector circuit 30 as differential-mode signals which are series aiming with respect to the signals initially propagated toward the amplifier-detector circuit 30. These reflected signals do not affect detection by the amplifier-detector circuit 30 either because they are in a series aiding relationship with readout information signals initially propagated toward the amplifier-detector circuit 30 or because they arrive after the strobe signal has terminated and has disabled the trigger circuit 110 of FIG. 2 from detecting. The particular manner of eliminating these reflected signals is dependent upon the word location along each pair of digit lines.

Because of the symmetry used and the circuit balance achieved with the bridge type direct-current coupling scheme of FIG. 1, information signals read out are applied to the differential amplifier 104 of FIG. 2 as differential mode voltage signals which are differentially amplified thereby. Balanced output signals of the differential amplifier 104 have different potentials for driving the emitter-follower 106. Signals from the output of the emitter-follower 106 raise the potential on the cathodes of the diodes 108 and 109 to different levels. Therefore, during a readout operation when a strobe pulse allows potential on the resistive coupling circuit in the flip-flop 110 to rise, the diodes 108 and 109 clamp the potential applied to the base electrodes of the flip-flop 110 to different potential levels and insure that a predetermined side of the trigger circuit 110 conducts and indicates that a 1 was stored in the particular cell being read or conversely the other side of trigger circuit conducts indicating that a 0 was stored.

Output signals from the flip-flop 110 are comprised of complementary levels which are amplified by the second balanced emitter-follower 114 and the balanced amplifier 115 before application to the utilization means 116.

The word line selection signals which occur during readout produce digit line noise which tends to mask, or hide, the information signals to be read out of the memory. In addition to their function required for reading information out of the cells, the word rail and the diode rail selection signals couple noise into the digit lines during the readout operation. The noise is generated in the digit lines in a manner similar to the manner in which noise is therein generated during the write-in operation. Any noise component coupled into any one point on one digit line is similar to another noise component coupled into a symmetrical point on another symmetrically arranged digit line so that the two components are rejected as common-mode voltage signals by the amplifier-detector circuit 30 in a manner similar to the manner in which the noise is rejected during write-in operations.

Figure 3:
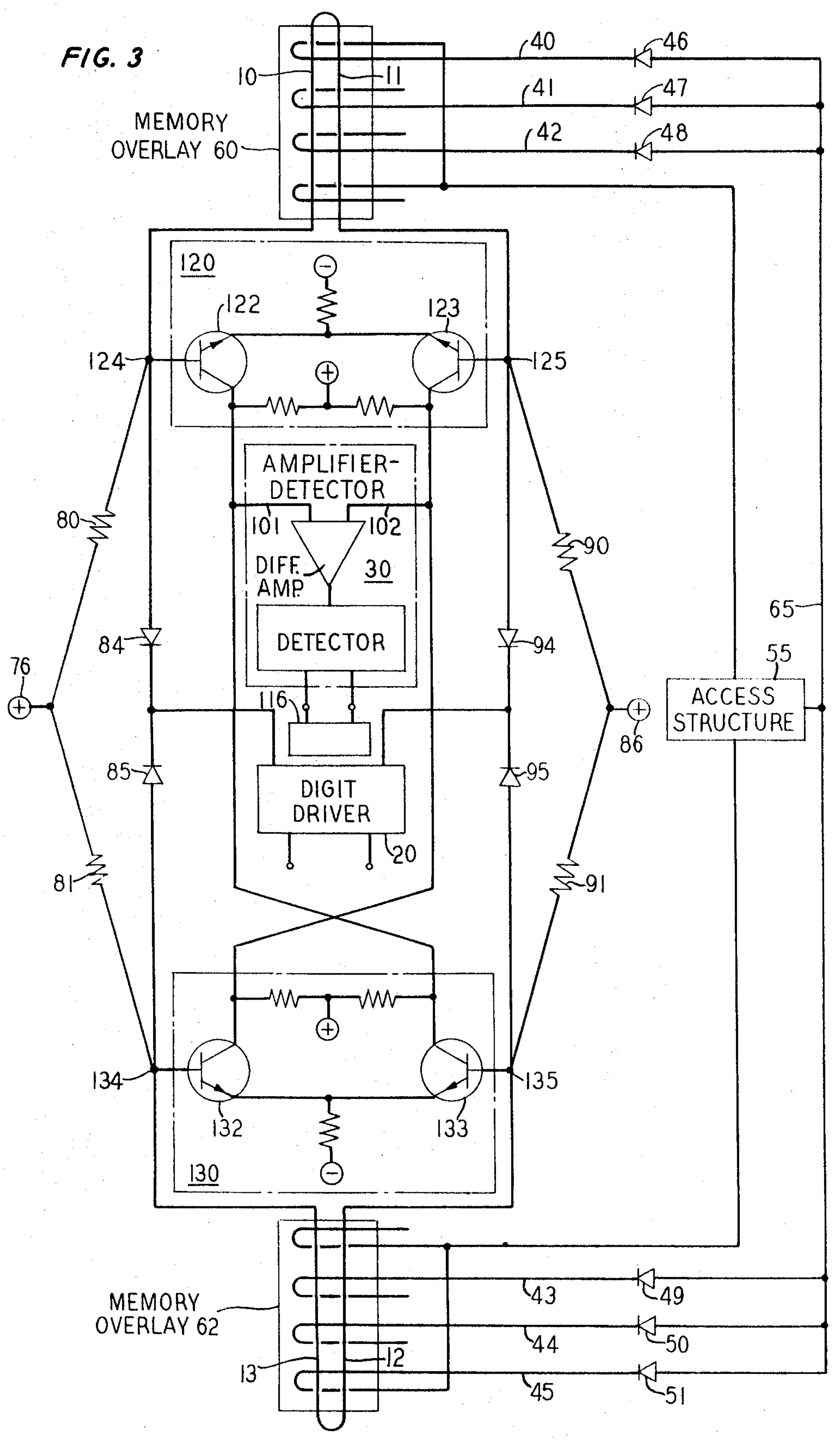
FIG. 3 is a schematic diagram of another symmetrical direct current coupling arrangement in accordance with the invention.

Referring now to FIG. 3, there is shown a schematic diagram of another embodiment of a circuit for direct current coupling plated-wire digit lines 10, 11, 12, and 13 to the digit driver 20 and to the amplifier-detector circuit 30.

The electrical and mechanical configuration of the digit lines 10, 11, 12, and 13 and their associated word lines 40, 41, 42, 43, 44, and 45, the access structure 55, the memory overlays 60 and 62, the digit driver 20, the amplifier-detector circuit 30, and the resistive coupling circuits is similar to that described in relation to the embodiment of FIG. 1 and is further described hereinafter only to the extent necessary to point out some differences. In addition the inductive and the capacitive coupling between the word lines and the digit lines is similar to that described in relation to the embodiment of FIG. 1.

As shown in FIG. 3, the digit lines 10, 11, 12 and 13 are coupled to the digit driver 20 in a loop arrangement that is similar to the arrangement used in the embodiment of FIG. 1. In FIG. 3, however, the digit lines 10 and 11 are connected together by a short lead at their top ends to make a hairpin loop, and the digit lines 12 and 13 are similarly connected together at their bottom ends to make another hairpin loop. The digit lines 10 and 11 are impedance balanced in the embodiment of FIG. 3 where they are terminated, respectively through the resistors 80 and 90 and the power supplies 76 and 86 to ground. Similarly, the digit lines 12 and 13 are impedance balanced in FIG. 3 where they are terminated respectively through the resistors 91 and 81 and the power supplies 76 and 86 to ground.

The digit lines 10, 11, 12, and 13 are direct current coupled by way of a pair of differential amplifiers to the amplifier-detector circuit 30. The digit lines 10 and 11 are coupled through a differential amplifier 120 to the amplifier-detector circuit 30, and the digit lines 12 and 13 are coupled through a differential amplifier 130 to the amplifier-detector circuit 30. The differential amplifiers 120 and 130 have equal gain.

The differential amplifier 120 is a conventional transistor differential amplifier including NPN transistors 122 and 123. A junction 124 among the resistor 80, the diode 84, and the digit line 10 is connected to the base input electrode of the transistor 122. Similarly, a junction 125 among the resistor 90, the diode 94, and the digit line 11 is connected to a base input electrode of the transistor 123. The portions of the digit lines 10 and 11 between the memory overlay 60 to the differential amplifier 120 are kept as short as possible so that they will be electrically a short length with respect to the anticipated pulse width of readout information signals. Balanced, or double-ended, output signals are produced at the collector electrodes of the transistors 122 and 123, which collector electrodes are connected respectively to the input leads 101 and 102 of the amplifier-detector circuit 30.

The differential amplifier 130 is also a conventional transistor differential amplifier using NPN transistors 132 and 133. A junction 134 among the resistor 81, the diode 85, and the digit line 13 is connected to a base input electrode of the transistor 132. Similarly, a junction 135 among the resistor 91, the diode 95, and the digit line 12 is connected to a base input electrode of the transistor 133. The portions of the digit lines 12 and 13 between the memory overlay 62 and the differential amplifier 130 are also kept as short as possible. Balanced, or double-ended, output signals are produced at collector electrodes of the transistors 132 and 133, which collector electrodes are connected respectively to the input leads 102 and 101 of the amplifier-detector circuit 30.

It should be noted that the outputs of the differential amplifiers 120 and 130 are essentially cross-connected to the input leads 101 and 102 fur purposes which will become apparent in the subsequent discussion of the embodiment of FIG. 3.

Both of the differential amplifiers 120 and 130 are biased to continuously operate in a linear region of conduction. They can be confined to linear operation because they are loaded by the input impedance of the input stage of the amplifier-detector circuit 30, which also is confined to linear operation as described in relation to FIG. 2. Since amplifiers 120 and 130 operate linearly and thereby maintain relatively constant high input impedances, there is little effect on the loading of any circuit connected thereto. Thus, there is little amplifier input impedance unbalance on the pairs of digit lines connected to the inputs of the differential amplifiers 120 and 130.

Information is written into the memory and is read out of the memory in operations similar to the operations of the embodiment of FIG. 1.

During write-in, a first word line current is applied, for example, to the selected word line 40 to rotate the flux in two cells located on the digit lines 10 and 11 where they intersect with the selected word line 40 to the hard direction of magnetization. Concurrently, a digit drive current is applied by the digit driver 20 to the digit lines 10 and 11 to tip the flux of the two cells into a remnant state giving a polarity indication of the information to be stored. For instance, one-half of the digit driver 20 couples ground potential through associated diodes, such as the diodes 84 and 85, to the digit lines 10 and 13. The other half of the digit driver 20 maintains a potential that back biases the diodes 94 and 95 so that a reference potential is maintained on the base input electrodes of the transistors 123 and 133. A digit drive current is conducted from the power supply 86 through the resistor 90, the digit lines 11 and 10, and the diode 84 to ground at the digit driver 20. Another digit drive current is conducted from the power supply 86 through the resistor 91, the digit lines 12 and 13 and the diode 85 to ground at the digit driver 20. These currents are digit drive signals that arrive concurrently at the base input electrodes of the transistors 123 and 133 and concurrently at the base input electrodes of the transistors 122 and 132 as equal amplitude signals.

Since the reference potential effectively is applied to the inputs of the transistors 123 and 133 and since equal amplitude signals are applied to the inputs of the transistors 122 and 132, the input signals to the differential amplifiers 120 and 130 are equal amplitude differential-mode signals. These differential-mode signals are differentially amplified by the amplifiers 120 and 130, which impress equal gain on those signals. Resulting double-ended output signals from the amplifiers 120 and 130 are cross-coupled through the collector circuits of the differential amplifiers 120 and 130 so that the differentially amplified digit drive signals are applied as common-mode input signals to the input leads 101 and 102 of the amplifier-detector circuit 30. As common-mode input signals to the differential amplifier input stage of the amplifier-detector circuit 30, these common-mode signals are readily rejected. For anticipated signal levels of the digit drive signals, the resulting signals on the leads 101 and 102 have amplitudes low enough so that the input stage of the amplifier-detector circuit maintains operation in its linear range of conduction. The input current to the amplifier-detector circuit remains substantially unchanged in response to the digit drive signals applied by the digit driver 20.

Soon after the digit drive current tips the storage cell flux, the word line current in the word line 40 is terminated and then the digit drive current is terminated. Thereafter, the polarized remnant state of the flux remains fixed until a readout operation occurs. If the state of the information bit to be written in had been of opposite polarity, the digit driver 20 would reduce the potential on the cathodes of diodes 94 and 95 to ground and maintain the reference potential on the cathodes of diodes 84 and 85. Thus, digit line currents of opposite polarity occur and establish an opposite polarity remnant condition in the storage cells.

In the operation of the embodiment of FIG. 3, word line signals produce digit line noise, as previously described in relation to the embodiment of FIG. 1. The noise, which may be either inductively or capacitively coupled to the digit lines 10, 11, 12, and 13, occurs on the digit lines during the write-in operation. Similar noise signals, for instance those capacitively coupled from partially selected word lines 40, 41, 42, 43, 44, and 45 to the digit lines 10, 11, 12, and 13, are propagated along the digit lines to the inputs of the differential amplifiers 120 and 130 as common-mode signals which are readily rejected by those amplifiers.

During readout, another word line current is applied to the word line 40 to again rotate the flux in the two storage cells of the digit lines 10 and 11, associated with the selected word line 40, to the hard direction of magnetization. This rotation of flux in the two cells, storing the information bit, generates output information signals on the digit lines 10 and 11. These information signals are to be detected by the amplifier-detector circuit 30. No information signals are generated concurrently on the other pair of digit lines 12 and 13 because there is no selected word line current in the word lines 43, 44, and 45 to initiate such information signals.

The information signals generated on the digit lines 10 and 11 each have two voltage components, one of which is propagated along the respective digit lines 10 and 11 toward the differential amplifier 120 and the other is propagated along the respective digit lines 10 and 11 away from the differential amplifier 120. The voltage component, on the digit line 10 and directed toward the differential amplifier 120, is of opposite polarity with respect to the voltage component, on the digit line 11 and directed toward the differential amplifier 120. These two voltage components are propagated respectively along the digit lines 10 and 11 to the inputs of the differential amplifier 120 where they are differential-mode input signals, which are differentially amplified. Since no information signals are generated concurrently on the digit lines 12 and 13, there are no differential-mode signals to be amplified by the differential amplifier 130. Double-ended output signals from the differential amplifier 120 therefore are applied as differential-mode signals to the input leads 101 and 102 of the amplifier-detector circuit 30 which readily detects them.

The voltage components of information signals, propagated along the digit lines 10 and 11 in a direction away from the differential amplifier 120, are conducted around the closed end of the hairpin loop. These voltage components on the digit lines 10 and 11 reach the inputs to the differential amplifier 120 concurrently with each other as differential-mode signals, but they either enhance detection because they are in series aiding polarity with respect to the voltage components initially propagated toward the amplifier-detector circuit 30 or do not interfere with detection by the amplifier-detector circuit 30 because they arrive too late. They are too late because the strobe signal which activates the amplifier-detector circuit 30 terminates and disables the amplifier-detector circuit 30 before the arrival of information signal components which are delayed more than a predetermined interval.

The word line signals which occur during readout produce digit line noise, as previously described in relation to the embodiment of FIG. 1. Any noise component thus coupled into any one point on one digit line is similar to another noise component thus coupled into a symmetrical point on another symmetrically arranged digit line. These similar components are rejected as common-mode signals by the differential amplifiers 120 and 130 in a manner similar to the manner in which the noise is rejected during write-in.

In the embodiment of FIG. 3, as in the embodiment of FIG. 1, the digit lines 10, 11, 12, and 13 are terminated in balanced resistors to minimize the effect of signal reflections. The terminating resistors are connected to the digit lines 10, 11, 12, and 13 for maintaining the impedance balance of the digit lines and are located at points such that similar reflections of pairs of noise signals always occur simultaneously at two different locations equally distance from the inputs to the differential amplifiers 120 and 130. These pairs of reflections are common-mode signals which are readily rejected by the differential amplifiers 120 and 130.

The direct current coupling arrangement of the digit lines 10, 11, 12, and 13 to the amplifier-detector circuit 30 advantageously enables such detection of information signals and rejects several noise components coupled into the digit lines 10, 11, 12, and 13 from the word lines 40, 41, 42, 43, 44, and 45. Because of the symmetry used in the access structure 55 and in the word line arrangement and because of the impedance balance of the circuit achieved by the configuration of the embodiment of FIG. 3, noise signals are readily rejected as common-mode signals, and information signals are readily detected as differential-mode signals. The output signals of the amplifier-detector circuit 30 are comprised of complementary level output signals which can drive the utilization means 116. As in the embodiment of FIG. 1, the amplifier-detector circuit 30 maintains the impedance balance on the pairs of digit lines 10, 11 and 12, 13 because the differential amplifier in the input stage of the amplifier-detector circuit 30 is confined to a linear region of conduction and because both differential amplifiers 120 and 130 operate linearly. Any reflections of noise signals on the digit lines 10 and 11 eventually are applied to the differential amplifier 120 as common-mode signals and therefore are rejected by the differential amplifier 120. Similar reflections of noise signals on digit lines 12 and 13 are rejected by the differential amplifier 130. Reflections of information signals on the digit lines 10, 11, 12, and 13 arrive at the input to the amplifier-detector circuit 30 too late to be detected.

Although the embodiment of FIG. 3 is adapted for rejecting common-mode noise signals from the pairs of digit lines, it has some limitations. The differential-mode gain of the amplifiers 120 and 130 must be closely matched to reject the digit drive signals at the input to the amplifier-detector circuit 30. In addition the transistors 122, 123, 132, and 133 limit the amplitude of digit drive signals because those signals are applied differential-mode to the amplifiers 120 and 130 and thereby subject those transistors to base-emitter breakdown.

Figure 4:
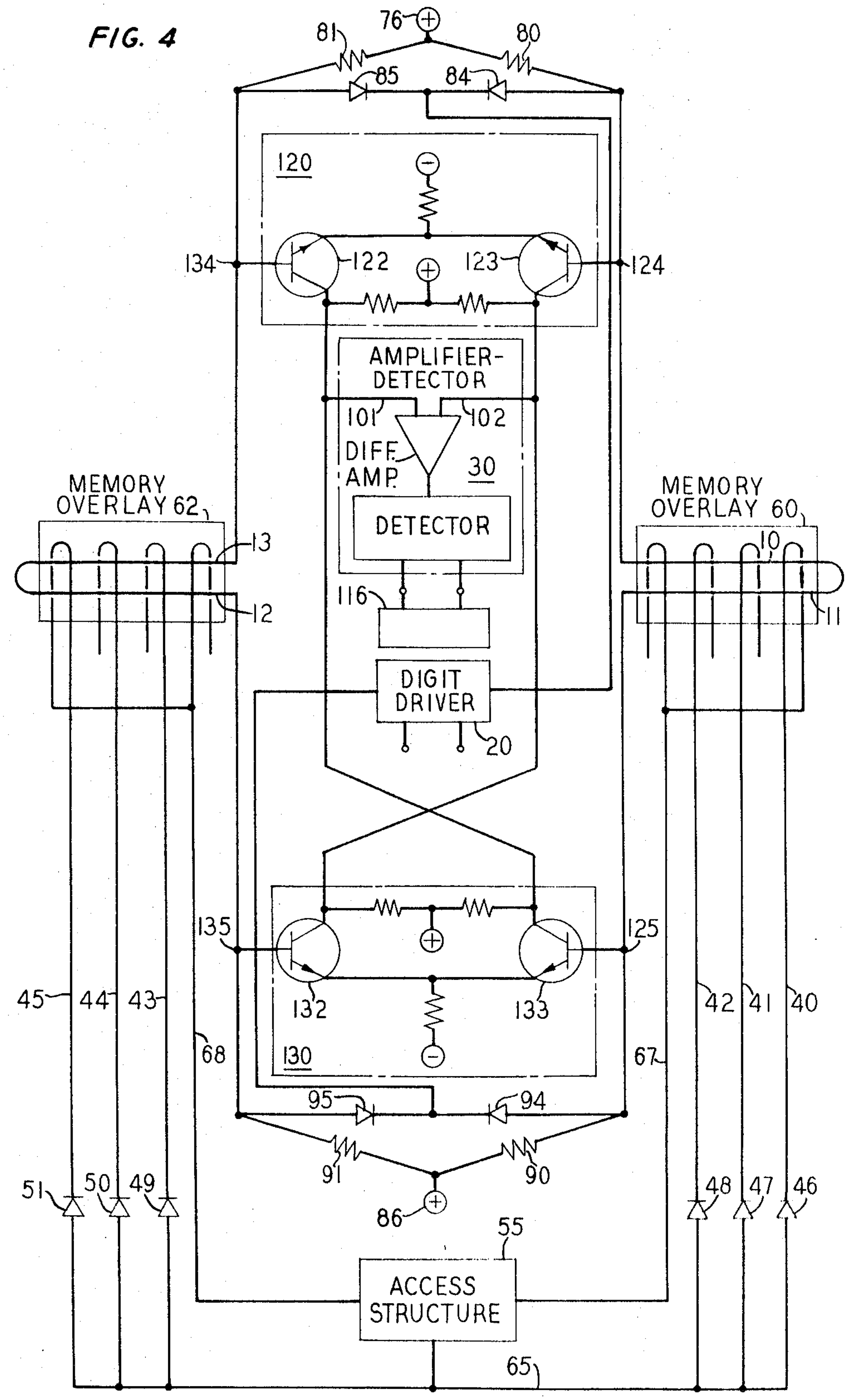
FIG. 4 is a schematic diagram of an additional symmetrical direct current coupling arrangement in accordance with the invention.

Referring now to FIG. 4, there is shown a schematic diagram of another embodiment of a circuit for direct current coupling a closed loop of plated-wire digit lines 10, 11, 12, and 13 to the digit driver 20 and to the amplifier-detector circuit 30.

The electrical and mechanical configuration of the digit lines 10, 11, 12, and 13 and their associated word lines 40, 41, 42, 43, 44, and 45, the access structure 55, the digit driver 20, the differential amplifiers 120 and 130, the amplifier-detector circuit 30, and the resistive coupling circuits is similar to that described in relation to the embodiment of FIG. 3 and is further described hereinafter only to the extent necessary to point out some differences. In addition, the inductive and the capacitive coupling between the word lines and the digit lines is similar to that described in relation to the embodiment of FIG. 1.

As shown in FIG. 4, the digit lines 10, 11, 12, and 13 are coupled to the digit driver 20 in an arrangement that is similar to the arrangement used in the embodiments of FIGS. 1 and 3. The digit lines 10, 11, 12, and 13 are direct current coupled by way of the pair of differential amplifiers 120 and 130 to the amplifier-detector circuit 30. In FIG. 4, however, the digit lines 10 and 13 are coupled through the differential amplifier 120 to the amplifier-detector circuit 30, and the digit lines 11 and 12 are coupled through the differential amplifier 130 to the amplifier-detector circuit 30. It should be noted that the outputs of the differential amplifiers 120 and 130 in FIG. 4 are essentially cross-connected to the input leads 101 and 102 in an arrangement like the one described in regard to the embodiment of FIG. 3.

In the embodiment of FIG. 4, both of the differential amplifiers 120 and 130 are biased to continuously operate in their linear regions of conduction in a manner similar to the operation of the embodiment of FIG. 3. Therefore, these amplifiers 120 and 130 maintain relatively constant input impedances which produce little impedance unbalance on the pairs of digit lines connected to their inputs.

In operation the scheme of FIG. 4 performs in a manner similar to the manner in which the scheme of FIG. 3 operates. A distinctive feature between the performance of the embodiment of FIGS. 3 and 4 is that digit drive signals in the embodiment of FIG. 4 are applied to the differential amplifiers 120 and 130 as common-mode signals rather than as differential-mode signals as in FIG. 3. Noise signals coupled into digit lines during write-in and readout operations always occur in pairs of components which arrive simultaneously at the inputs of the differential amplifiers 120 and 130 whereby the noise components are rejected. The pairs of noise signals are propagated through different combinations of digit lines than they were in the embodiment of FIG. 3, but the symmetry of the circuits is arranged so that the noise components are still applied substantially as common-mode signals to the differential amplifiers 120 and 130 as in the embodiment of FIG. 3. Any differential-mode components of noise amplified by the amplifiers 120 and 130 are rejected as common-mode signals by the amplifier-detector circuit 30. Information signals read out of the cells are applied to the differential amplifiers 120 and 130 as differential-mode signals just as in the operation of the embodiment of FIG. 3.

Since differential-mode components of noise applied to the differential amplifiers 120 and 130 must be rejected as common-mode signals by the amplifier-detector circuit 30, there is a requirement of matched differential-mode gain for the differential amplifiers 120 and 130 as in the embodiment of FIG. 3, but the transistors 122, 123, 132 and 133 are not subjected to differential-mode digit drive signals and resulting limitation on drive signal amplitude.

Output signals of the amplifier-detector circuit 30 are comprised of complementary level output signals which can drive the utilization means 116. Just as in the embodiment of FIG. 1, the amplifier-detector circuit 30 maintains the impedance balance on the pairs of digit lines 10, 11 and 12, 13 because the differential amplifier in the input stage of the amplifier-detector circuit 30 is confined to a linear region of conduction and because both differential amplifiers 120 and 130 also operate linearly. The differential amplifiers 120 and 130 therefore have relatively constant input impedances which load the digit lines 10, 11, 12, and 13 and maintain the impedance balance on the digit lines for all anticipated operating conditions.

Figure 5:
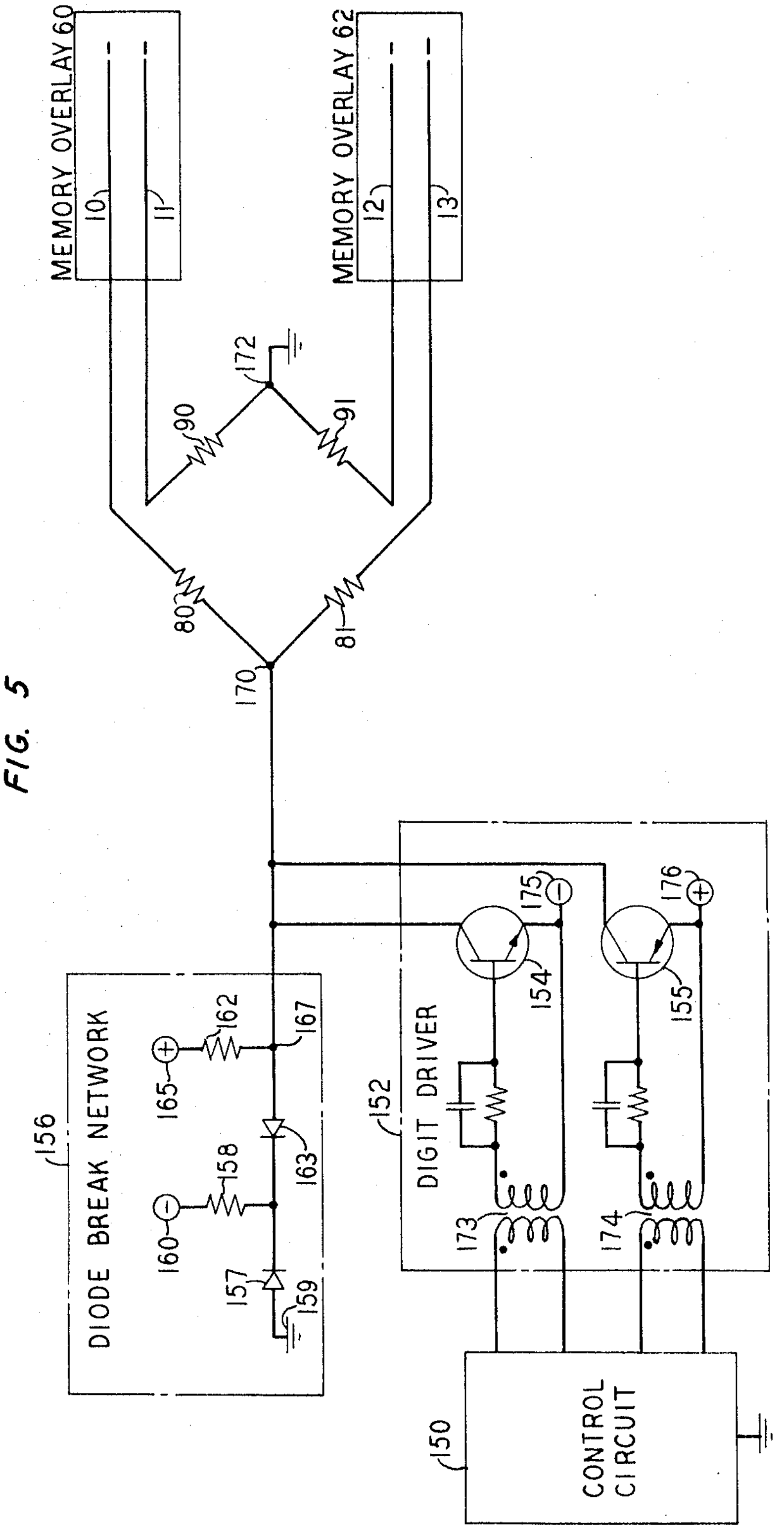
FIG. 5 is a schematic diagram of an arrangement for direct current coupling an alternative digit drive circuit to symmetrical pairs of digit lines used in various embodiments of the invention.

Referring now to FIG. 5, there is shown an alternative arrangement for applying digit drive signals to the digit lines 10, 11, 12, and 13 in the embodiments of FIGS. 1, 3, and 4. In the arrangement of FIG. 5, there is a control circuit 150 which applies either a 1 or a 0 information signal to a digit driver circuit 152 for controlling conduction through transistors 154 and 155 therein. A diode break network 156 is interconnected with the collector circuits of the transistors 154 and 155 for controlling the potential level occurring at the collector electrodes of the transistors 154 and 155. The potential level thus established is coupled to the digit lines 10, 11, 12, and 13 to indicate whether a 1 or a 0 information signal is applied to the input of the digit driver 152.

The diode break network 156 and the digit driver 152 are connected together in the following manner. In the diode break network 156, a first diode 157 and a resistor 158 couple ground 159 to a negative polarity power supply terminal 160. A resistor 162, a diode 163, and the resistor 158 couple a positive polarity power supply terminal 165 to the negative polarity power supply terminal 160. The collector electrodes of the transistors 154 and 155 are connected to a junction 167 between the resistor 162 and the anode of the diode 163.

A circuit used for coupling the digit driver 152 and the diode break network 156 to the digit lines 10, 11, 12, and 13 is slightly different from the coupling circuit used in the embodiments shown in FIGS. 1, 3, and 4. In FIG. 5 the coupling circuit includes a pair of balanced resistors 80 and 81 having an intermediate junction 170 connected to the junction 167. The opposite ends of the resistors 80 and 81, respectively, are connected to the digit lines 10 and 13 in a manner similar to the embodiments shown in FIGS. 1, 3, and 4. Another pair of balanced resistors 90 and 91 have an intermediate junction 172 that is connected to ground rather than to a power supply, as shown in FIGS. 1, 3, and 4. In FIG. 5, the opposite ends of the resistors 90 and 91 are connected respectively to the digit lines 11 and 12, also in a manner similar to the embodiments shown in FIGS. 1, 3, and 4. A further difference is that the several diodes included in the coupling circuit of the embodiments shown in FIGS. 1, 3, and 4 are omitted from the embodiment shown in FIG. 5. It should be remembered, however, that in the embodiments of FIGS. 1, 3, and 4 there are two different patterns of interconnections between digit lines. In FIG. 1, the digit lines 10 and 12 are connected together to the input lead 101, and the digit lines 11 and 13 are connected together to the input lead 102. In FIGS. 3 and 4 the digit lines 10 and 11 are connected together in a hairpin loop, and the digit lines 12 and 13 are connected together in another hairpin loop. Either of these patterns of interconnections can be used with the embodiment of FIG. 5 so that there are two closed paths from the junction 170 to the junction 172 even though these two paths are not shown in FIG. 5.

The digit driver 152 and the diode break network 156 operate in response to the control circuit 150 and help write an information bit into the storage cells of the digit lines 10, 11, 12, and 13 in a manner similar to the manner in which an information bit is stored in the embodiments of FIGS. 1, 3, and 4. At any particular time, the control circuit 150 applies one or another of three significant types of signals to the digit driver 152.

The three types of signals represent a standby state and 1 and 0 information bits to be written into memory cells. A 1 is represented by a positive-going transient signal applied to the base of the transistor 154. A 0 is represented by a negative-going transient signal applied to the base of the transistor 155. The standby state is represented by any level signal condition from both outputs of the control circuit 150.

By means of the digit driver 152 and the diode break network 156, these signals from the control circuit 150 are converted respectively to a first polarity digit line current, to a second polarity digit line current, and to no digit line current.

At times other than during a write-in operation, no information is written into the memory cells and the digit driver 152 and the diode break network 156 are held in their standby state so that they supply no digit line current. At such times the level signals from both outputs of the control circuit 150 occur but are not coupled through transformers 173 and 174 to the transistors 154 and 155. The transistors 154 and 155 are cut off, and the diode break network 156 is conducting. During such standby operation, a current is conducted from the power supply 165 through the resistor 162, the diode 163, and the resistor 158 to the power supply 160. Concurrently, another current is conducted from ground 159 through the diode 157 and the resistor 158 to the power supply 160. As a result of these two currents, the junction 167 is held at essentially ground potential. Since the ground potential of the junction 167 is applied directly to the junction 170 and since the junction 172 is at ground potential, no digit line current is established in any of the digit lines 10, 11, 12, and 13.

During any write-in operation, a word line current orients flux in two selected storage cells into their hard direction of magnetization as previously described in relation to FIGS. 1, 3, and 4, and the digit driver 152 an the diode break network 156 initiate a digit line current representing either a 1 or a 0 bit. This digit line current, depending upon its polarity, tips the flux in the two selected cells into one of the easy directions of magnetization thereby representing the information bit to be stored.

Thus during a write-in operation when a positive-going signal, representing a 1 bit from the control circuit 150, is coupled to the transistor 154, it is biased into conduction so that the potential at the junction 167 falls to a negative potential determined by the potential of an emitter circuit power supply 175 and by a voltage drop across the transistor 154 which conducts in saturation. This negative potential on the junction 167 back biases the diode 163 and is coupled respectively through the resistors 80 and 81 to the digit lines 10 and 13 so that an information bit 1 of a first polarity can be written into storage bits along the digit lines. It is noted again that the digit lines 10 and 13 are interconnected with the digit lines 11 and 12 in the embodiments of FIGS. 1, 3, and 4. Digit drive current is then conducted from ground at junction 172 through the resistors 90 and 91, the digit lines 11 and 12, the digit lines 10 and 13, the resistors 80 and 81, and through the transistor 154 to the negative potential power supply 175. The information bit 1, to be stored in the cells selected by word line current, is written in by the digit drive current tipping the flux of the selected cells in the same manner that information is stored in the embodiments of the FIGS. 1, 3, and 4. The word line current is terminated while the digit drive current is tipping the flux so that the flux will remain in a remnant condition wherein the polarity represents the information bit 1 after the digit drive current is removed until another word line current is established during a subsequent readout or write-in operation.

When a negative-going signal, representing a 0 bit from the control circuit 150, is coupled to the transistor 155, it is biased into conduction so that the potential at the junction 167 rises to a positive potential determined by the potential of an emitter circuit power supply 176 and by a voltage drop across the transistor 155 which conducts in saturation. Although this positive potential on the junction 167 forward biases the diode 163, it back biases the diode 157 and is coupled respectively through the resistors 80 and 81 to the digit lines 10 and 13 so that a 0 information bit of a second polarity can be written into storage bits along the digit lines. Once again, it is noted that the digit lines 10 and 13 are interconnected with the digit lines 11 and 12 in the embodiments of FIGS. 1, 3, and 4. Digit drive current is then conducted from the power supply 176 through the transistor 155, the resistors 80 and 81, the digit lines 10 and 13, the digit lines 11 and 12, and the resistors 90 and 91 to ground. The 0 information bit, to be stored in the cells selected by word line current, is written in by the digit drive current tipping the flux of the selected cells in the same manner that information is stored in the embodiments of FIGS. 1, 3, and 4. The word line current is terminated while the digit drive current is tipping the flux so that the flux will remain in a remnant condition wherein the polarity represents the information bit 0 after the digit drive current is terminated until another word line current is established during a subsequent readout or write-in operation.

Figure 6:
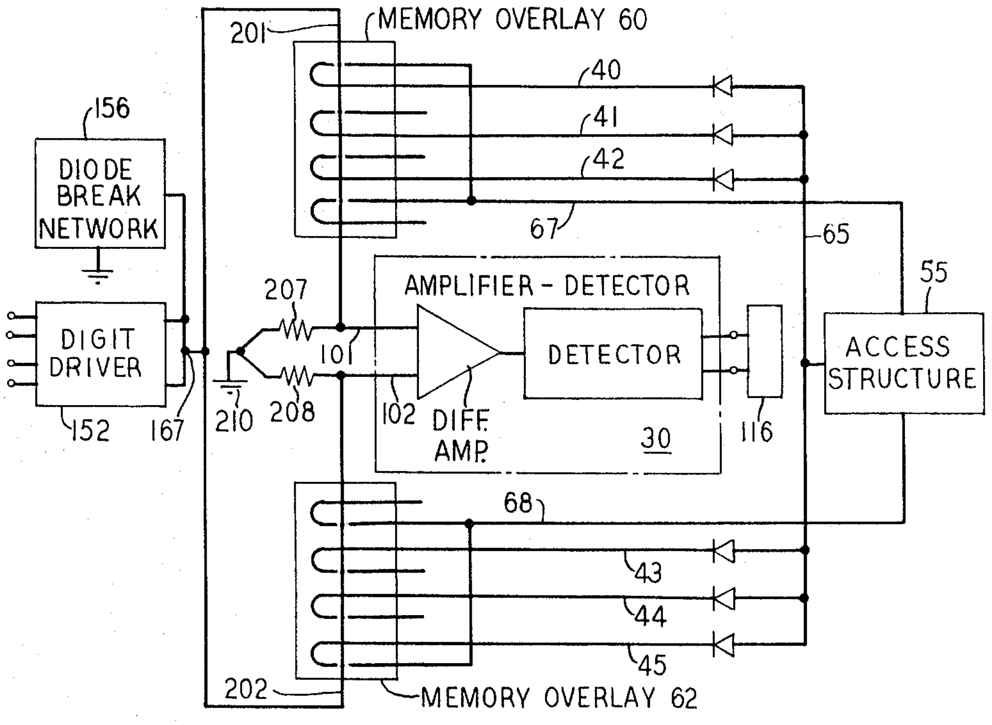
FIG. 6 is a schematic diagram of a further symmetrical direct current coupling arrangement in accordance with the invention.

Referring now to FIG. 6, there is shown a schematic diagram for symmetrically direct current coupling magnetic memory lines 201 and 202 to the combination of the digit driver 152 and the diode break network 156 and to the amplifier-detector circuit 30 in an arrangement similar to the arrangement shown in FIG. 5. For exemplary purposes the digit lines 201 and 202 are conventional plated-wire conductors similar to the digit lines described with respect to the embodiment of FIG. 1 except that in the embodiment of FIG. 6 the digit lines 201 and 202 are arranged to store information in only one cell per information bit rather in two cells per bit as in the embodiment of FIG. 1.

The electrical and mechanical configuration of the memory is similar to the configuration described in connection with FIG. 1, as modified by FIG. 5, except for changes required because each information bit is stored in only one cell rather than in two cells. For instance one such change is that the junction 167 in the output of the digit driver 152 and the diode break network 156 is connected directly by way of parallel branches to the digit lines 201 and 202. Each branch connects the junction 167 directly to an end of one of the digit lines 201 and 202 rather than coupling the junction 167 through resistors to the digit lines, as shown in FIG. 5. The portions of the digit lines 201 and 202 between the junction 167 and the memory overlays 60 and 62 are made as short as possible as in the embodiments of FIGS. 1 3, and 4. The opposite end of each digit line in FIG. 6 is coupled respectively by way of balanced resistors 207 and 208 to ground potential 210 rather than being coupled back through another digit line to a terminating resistor, as shown in FIG. 5. In FIG. 6, a junction between the digit line 201 and the resistor 207 is connected to the input lead 101 of the amplifier-detector circuit 30. Similarly, a junction between the digit line 202 and the resistor 208 is connected to the input lead 102 of the amplifier-detector circuit 30. These connections between the digit lines 201 and 202 and the amplifier-detector circuit 30 are also kept as short as possible. It should be noted that electrical symmetry of the digit line arrangement is achieved by making the digit lines equally long and by terminating them in the balanced resistors 207 and 208.

Two important features of the embodiment of FIG. 1 are retained in the embodiment of FIG. 6. One such feature is that the access structure 55, the diode rail 65, the word lines 40, 41, 42, 43, 44, and 45, and the word rails 67 and 68 are arranged symmetrically to couple similar noise into each of the digit lines 201 and 202. The second such feature is that the access structure 55 is not tied to the common ground of the memory.

During operation, the digit driver 152 and the diode break network 156 apply either the standby signal or the signals representing the information bits 1 and 0 to the digit lines 201 and 202. At times other than during write-in operations, no information is being written into the memory cells, and the digit driver 152 and the diode break network 156 are held in their standby state. The standby signal or ground level at the junction 167 is applied to the digit lines 201 and 202, and there is no digit line current because each of the digit lines 201 and 202 is grounded at each end. During write-in operations, the 1 and 0 bit signals from the junction 167 are applied to the digit lines 201 and 202, and those signals respectively create a first polarity digit line current and a second polarity digit line current.

Thus, during a write-in operation, a word line current in a word line, such as the word line 40, orients flux in a selected storage cell of the digit line 201 into the hard direction of magnetization, and digit line currents representing either a 1 and or a 0 are initiated in both of the digit lines 201 and 202. With respect to the digit driver 152, the currents in the digit lines 201 and 202 have the same polarity. The digit line current in digit line 201, depending upon its polarity, tips the flux of the selected storage cell into one or the other of the easy directions of magnetization thereby storing the information bit when the current in word line 40 is terminated. Because the digit line currents in the digit lines 201 and 202 concurrently have the same polarity and because of the symmetry of the digit lines 201 and 202, the digit line signals are coupled to the differential amplifier in the input stage of the amplifier-detector circuit 30 as common-mode signals, which are readily rejected. In response to these digit line signals, the differential amplifier just mentioned continues to conduct in the linear region of its characteristic, as previously described in relation to FIG. 3. There is substantially no current change to the input of the amplifier-detector circuit 30 in response to the signals from the digit driver 152.

Noise components, which may be either inductively or capacitively coupled to the digit lines 201 and 202, occur on those digit lines during such a write-in operation. Because of the symmetry in the embodiment of FIG. 6, the noise components, for instance those capacitively coupled from the word lines to the digit lines, are similar on each of the digit lines 201 and 202 and are propagated along the digit lines 201 and 202 to the input leads 101 and 102. The components of noise on the leads 101 and 102 appear as common-mode signals which are rejected by the differential amplifier in the input stage of the amplifier-detector circuit 30.

During readout operations, an information signal is generated by the information bit stored in a selected storage cell of one of the digit lines, such as the digit line 201, in response to current in a word line, such as the word line 40. No information signal is generated concurrently on the digit line 202 because there is no current in the word lines 43, 44 and 45 to initiate such an information signal. The information signal generated on the digit line 201 has two opposite polarity voltage components which are propagated in opposite directions along the digit line 201. One of the voltage components is propagated toward the input of the amplifier-detector circuit 30, and the other voltage component initially is propagated away from the input of the amplifier-detector circuit 30. The component which is propagated toward the amplifier-detector circuit 30 arrives there and is readily detected as a differential-mode signal while a strobe signal is activating the amplifier-detector circuit 30. The component which initially is propagated away from the amplifier-detector circuit 30 either enhances detection because its polarity after reflection is series aiding with respect to the component initially propagated toward the amplifier-detector circuit 30 or does not interfere with detection because it arrives at the amplifier-detector circuit 30 too late to be detected. It is too late for detection when the strobe signal is terminated and the amplifier-detector circuit 30 is disabled from detecting before this latter component arrives.

Noise components, which may be either inductively or capacitively coupled to the digit lines 201 and 202, also occur on those digit lines during the readout operation. Because of the circuit symmetry this noise, for instance, that capacitively coupled to the digit lines 201 and 202, is similar on each digit line and is propagated along the symmetrical digit lines 201 and 202 to the input leads 101 and 102. The components of noise on the leads 101 and 102 appear as common-mode signals which are rejected by the differential amplifier in the input stage of the amplifier-detector circuit 30.

Because of the symmetry used and because of the circuit balance achieved by the configuration of FIG. 6, noise signals, caused either by word line select signals or by digit drive signals or by the reflections of either, are rejected as common-mode signals, and information signals are detected as differential-mode signals. The output signals of the amplifier-detector circuit 30 are comprised of complementary level signals which represent the information bits 1 and 0 and are used to drive the utilization circuit not shown. The amplifier-detector circuit 30 maintains the impedance balance on the digit lines 201 and 202 in a manner previously described in relation to the embodiment of FIG. 1.

Figure 7:
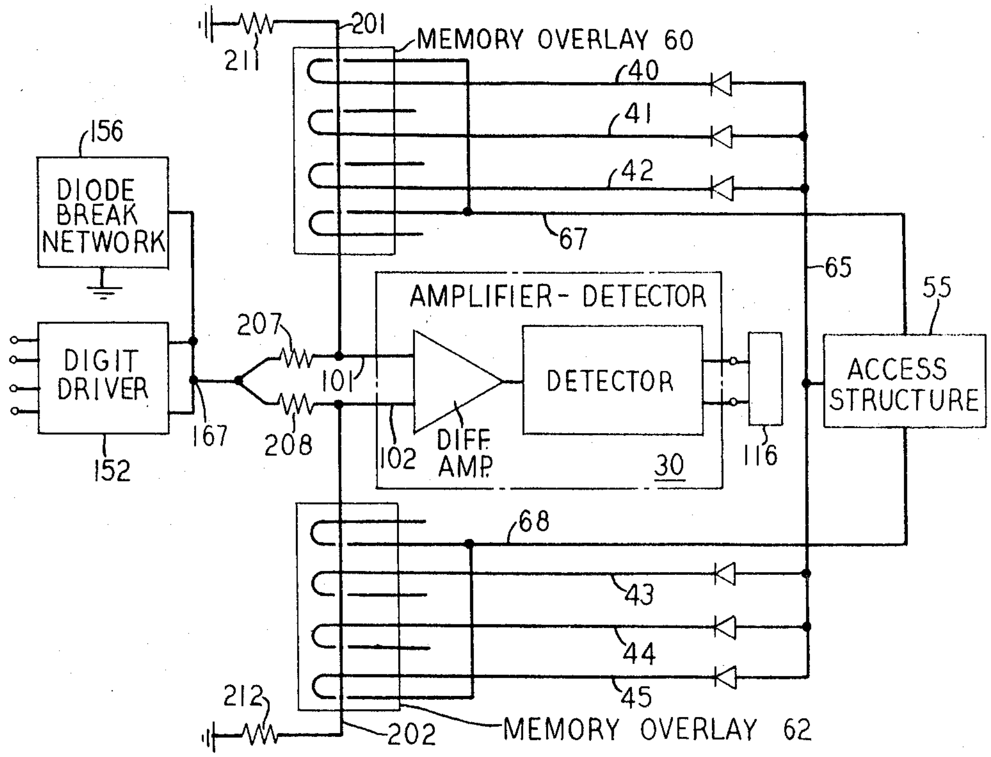
FIG. 7 is a schematic diagram of a still further symmetrical direct current coupling arrangement in accordance with the invention.

Referring now to FIG. 7, there is shown another schematic diagram for symmetrically direct current coupling magnetic memory lines 201 and 202 to the combination of the digit driver 152 and the diode break network 156 and to the amplifier-detector circuit 30 in an arrangement similar to the arrangement of FIG. 6. The arrangement of FIG. 7 is similar to the arrangement of the embodiment of FIG. 6 except for the manner in which the digit driver 152 and the diode break network 156 are coupled to the digit lines 201 and 202 and except for the way the digit lines 201 and 202 are impedance balanced.

The junction 167 of the combination of the digit driver 152 and the diode break network 156 is coupled by way of parallel branches through the resistors 207 and 208 to the digit lines 201 and 202. Each of the resistors 207 and 208 respectively couples the junction 167 to one end of one of the digit lines 201 and 202. The opposite end of each of the digit lines 201 and 202 is connected respectively through balanced resistors 211 and 212 to ground. The junction between the resistor 207 and the digit line 201 is connected to the input lead 101, and the junction between the resistor 208 and the digit line 202 is connected to the input lead 102 as in the embodiment of FIG. 6. In FIG. 7, however, the connection shown in FIG. 6 from the resistors 207 and 208 to ground 210 is omitted. Electrical symmetry of the digit line arrangement of FIG. 7 is achieved by making the digit lines 201 and 202 equally long, by terminating them respectively through the balanced resistors 211 and 212 at one end, and by coupling the opposite ends through the balanced resistors 207 and 208.

In a manner similar to the embodiment of FIG. 6, symmetry is maintained in the access structure 55 the diode rail 65, the word lines 40, 41, 42, 43, 44, and 45, and the word rails 67 and 68. The access structure 55 is not grounded to the common ground of the embodiment of FIG. 7.

The embodiment of FIG. 7 operates similar to the operation of the embodiment of FIG. 6 except for changes resulting from the arrangement in which digit drive signals are coupled into the digit lines 201 and 202. These digit drive signals are coupled through the balanced resistors 207 and 208 to the digit lines 201 and 202. As a result the amplitude of digit drive signals is increased to produce the same digit drive current in the digit lines, however, there is an advantage to terminating the far ends of the digit lines 201 and 202 in the resistors 211 and 212 so that the long loop coupling the junction 167 to the digit lines 201 and 202 is eliminated for preventing pick up of excessive extraneous noise signals.

Several advantages are realized by the direct current coupling schemes of the embodiments of FIGS. 1, 3, 4, 5, 6, and 7. Each of the digit current coupling schemes eliminates the need for the alternating current coupling balanced magnetic ring which previously has been interposed between magnetic memories and associated digit drive and sensing, or detector, circuits. Such a magnetic ring has always been fabricated by expensive hand wiring and inherently has inserted undesirable delay time in the sensing, or detection, circuit operation. Because the magnetic ring is not required in the embodiments of FIG. 1, 3, 4, 5, 6, and 7, the detrimental hand wiring and delay time heretofore caused by the magnetic ring are eliminated. In their place fabrication by inexpensive automatic methods and improved operating speed of the memory and its associated computing system are substituted. Therefore, the disclosed direct current coupling schemes achieve the advantages of reducing the fabrication expense and increasing operating speed, which have been limited in prior art magnetic memories.

The above-detailed description is illustrative of some embodiments of the invention, and it is to be understood that additional embodiments thereof will be obvious to those skilled in the art. The embodiments disclosed herein, together with those additional embodiments, are considered to be within the scope of the invention.

We claim:

1. A magnetic memory sensing circuit comprising:
a plurality of digit lines arranged in a closed loop;
an amplifier-detector circuit connected in a first branch across the loop, the amplifier-detector circuit includes an input impedance having a value substantially larger than a characteristic impedance of the digit lines; and
a digit driver circuit connected in a second branch across the loop, the second branch being a conjugate branch with the first branch.

2. A magnetic memory sensing circuit in accordance with claim 1 further comprising:
a symmetrical access structure coupling common-mode noise signals into the digit lines for propagation to the amplifier-detector circuit.

3. A magnetic memory sensing circuit in accordance with claim 1 wherein:
the amplifier-detector circuit is connected to a first end of each digit line; and
diodes couple the digit drive circuit to a second end of each digit line.

4. A magnetic memory sensing circuit in accordance with claim 1 wherein:
a first differential amplifier couples differential-mode signals from the digit driver circuit to the amplifier-detector circuit;
a second differential amplifier couples differential-mode signals from the digit driver circuit amplifier-detector circuit; and
diodes couple the digit driver circuit to the first end of each digit line.

5. A magnetic memory sensing circuit in accordance with claim 1 wherein:
a first differential amplifier couples common-mode signals from the digit driver circuit to the amplifier-detector circuit;
a second differential amplifier couples common-mode signals from the digit driver circuit to the amplifier-detector circuit; and
diodes couple the digit driver circuit to a first end of each digit line.

6. A magnetic memory sensing circuit in accordance with claim 1 wherein:
the amplifier-detector circuit is connected to a first end of each four digit lines; and balanced resistors in the closed loop couple the digit driver circuit to a second end of each digit line.

7. A magnetic memory sensing circuit in accordance with claim 1 wherein:

a first differential amplifier couples differential-mode signals from the digit driver circuit to the amplifier-detector circuit;

a second differential amplifier couples differential-mode signals from the digit driver circuit to the amplifier-detector circuit; and balanced resistors in the closed loop couple the digit driver circuit to a first end of each digit line.

8. A magnetic memory sensing circuit in accordance with claim 1 wherein:

a first differential amplifier couples common-mode signals from the digit driver circuit to the amplifier-detector circuit;

a second differential amplifier couples common-mode signals from the digit driver circuit to the amplifier-detector circuit; and balanced resistors in the closed loop couple the digit driver circuit to a first end of each digit line.

9. A magnetic memory sensing circuit in accordance with claim 1 wherein:

the amplifier-detector circuit is connected to a first end of each digit line; and a digit driver is connected to a second end of each digit line.

10. A magnetic memory sensing circuit in accordance with claim 1 wherein:

an amplifier-detector circuit is connected to a first end of each digit line; and balanced resistors in the closed loop couple the digit driver circuit to the first end and to a second end of each digit line.

11. A magnetic memory sensing arrangement comprising:

first and second digit lines;

a digit driver direct current coupled to the first and second digit lines for applying a digit drive signal thereto;

a first storage cell coupled to the first digit line for storing an information bit in response to the digit drive signal;

means alternating current coupled to the first cell for causing a readout information signal representing the information bit stored in the first cell to be generated on the first digit line and coupling similar noise components into the first and second digit lines;

means for amplifying and detecting the readout information signal, the amplifying and detecting means rejecting the similar noise components on the first and second digit lines and converting the readout information signal to complementary level output signals; and means direct current coupling the readout information signal to the amplifying and detecting means, the direct current coupling means coupling concurrently to the amplifying and detecting means the similar noise components on the first and second digit lines.

12. A magnetic memory sensing arrangement in accordance with claim 11 wherein:

the first and second digit lines are arranged in symmetrical modules.

13. A magnetic memory sensing arrangement in accordance with claim 12 wherein:

a second storage cell is coupled to the second digit line; and the first and second storage cells comprise magnetic material disposed circumferentially about the respectively first and second digit lines, which material has a preferred direction of magnetization oriented circumferentially about the first and second digit lines.

14. A magnetic memory sensing arrangement in accordance with claim 11 wherein:

a second storage cell is coupled to the second digit lines, and the alternating current coupled means comprising;

a symmetrical access structure; and first and second symmetrically arranged word lines alternating current coupling the access structure respectively to the first and second storage cells.

15. A magnetic memory sensing arrangement in accordance with claim 11 further comprising:

means impedance balancing the first and second digit lines concurrently with existence of the digit drive signals.

16. A magnetic memory sensing arrangement in accordance with claim 11 wherein the direct current coupling means comprises:

a first connection between the first digit line and a first input of the amplifying and detecting means; and a second connection between the second digit line and a second input of the amplifying and detecting means.

17. A magnetic memory sensing arrangement in accordance with claim 16 further comprising:

a second storage cell coupled to the second digit line;

third and fourth digit lines;

a third storage cell coupled to the third digit line;

a fourth storage cell coupled to the fourth digit line;

the alternating current coupled means comprising:

an access structure arranged symmetrically, a first word line for alternating current coupling the access structure to the first and third storage cells, and a second word line arranged symmetrically with the first word line for alternating current coupling the access structure to the second and fourth storage cells; and the direct current coupling means comprising:

a third connection between the third digit line and the second input of the amplifying and detecting means, and a fourth connection between the fourth digit line and the first input of the amplifying and detecting means.

18. A magnetic memory sensing arrangement in accordance with claim 11 further comprising:

a second storage cell coupled to the second digit line;

third and fourth digit lines;

a third storage cell coupled to the third digit line;

a fourth storage cell coupled to the fourth digit line; and the direct current coupling means comprising:

a first differential amplifier coupling the first and third digit lines to the amplifying and detecting means, and a second differential amplifier coupling the second and fourth digit lines to the amplifying and detecting means.

19. A magnetic memory sensing arrangement in accordance with claim 18 wherein:

the alternating current coupled means comprises:

a symmetrical access structure, and first and second symmetrically arranged word lines alternating current coupling the access structure respectively to the first and second storage cells.

20. A magnetic memory sensing arrangement in accordance with claim 11 further comprising:

a second storage cell coupled to the second digit line;

a third and fourth digit lines;

a third storage cell coupled to the third digit line;

a fourth storage cell coupled to the fourth digit line; and the direct current coupling means comprising:

a first differential amplifier coupling the first and second digit lines to the amplifying and detecting means, and a second differential amplifier coupling the third and fourth digit lines to the amplifying and detecting means.

21. A magnetic memory sensing arrangement in accordance with claim 20 wherein:

the alternating current coupled means comprising:

a symmetrical access structure, and a first and second symmetrically arranged word lines alternating current coupling the access structure respectively to the first and second storage cells.

22. A magnetic memory sensing arrangement comprising:

first and second digit lines;

a first storage cell in a magnetic film circumferentially coating the first digit line;

a second storage cell in a magnetic film circumferentially coating the second digit line;

means without an input transformer producing an output signal which is a function of the difference between signals on two input terminals;

means direct current coupling the first and second digit lines respectively to the two input terminals;

first and second word lines associated respectively with the first and second cells for changing magnetization therein:

the first and second digit lines arranged to generate an information pulse which affects the output of the producing means whenever the magnetization of the storage cells is changed; and the first and second digit lines and the first and second word lines arranged to electrostatically induce into the first and second digit lines like polarity pulses which are propagated concurrently to the two inputs of the producing means and are rejected by the producing means.

23. A magnetic memory sensing arrangement in accordance with claim 22 further comprising:

a symmetrical access structure; and the first and second word lines arranged for symmetrically coupling the access structure to the first and second digit lines.